(12) United States Patent
Kothandam

(10) Patent No.: US 9,449,730 B2
(45) Date of Patent: Sep. 20, 2016

(54) COATING COMPOSITION FOR PREVENTION OF SUBSTRATE OXIDATION

(71) Applicant: COUNCIL OF SCIENTIFIC & INDUSTRIAL RESEARCH, New Delhi (IN)

(72) Inventor: Krishnamoorthy Kothandam, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 14/374,355

(22) PCT Filed: Jan. 24, 2013

(86) PCT No.: PCT/IB2013/050606
§ 371 (c)(1),
(2) Date: Jul. 24, 2014

(87) PCT Pub. No.: WO2013/111080
PCT Pub. Date: Aug. 1, 2013

(65) Prior Publication Data
US 2015/0014597 A1   Jan. 15, 2015

(30) Foreign Application Priority Data
Jan. 25, 2012  (IN) .............................. 215/DEL/2012

(51) Int. Cl.
*H01B 1/00* (2006.01)
*C09D 5/08* (2006.01)
(Continued)

(52) U.S. Cl.
CPC . *H01B 1/12* (2013.01); *C08K 3/04* (2013.01); *C09D 5/08* (2013.01); *C09D 165/00* (2013.01); *C09D 165/02* (2013.01); *C23F 13/02* (2013.01); *C08G 2261/1424* (2013.01);
(Continued)

(58) Field of Classification Search
CPC .......... H01B 1/00; H01B 1/12; H01B 1/127; H01B 1/128; C09D 5/08; C09D 165/02; B05D 5/00
See application file for complete search history.

(56) References Cited

U.S. PATENT DOCUMENTS

| 6,762,238 B1 | 7/2004 | Yang et al. |
| 2005/0279399 A1 | 12/2005 | Gaudiana et al. |
| 2012/0216866 A1* | 8/2012 | Kato ...................... B82Y 10/00 |
| | | 136/263 |

FOREIGN PATENT DOCUMENTS

| EP | 0 593 111 A1 | 4/1994 | |
| WO | WO 2011/052568 | * 5/2011 | ............. H01L 51/42 |

OTHER PUBLICATIONS

Campos et al., "Photovoltaic activity of a PolyProDOT derivative in a bulk heterojunction solar cell," Solar Energy Materials and Solar Cells, 90, pp. 3531-3546 (2006).*
(Continued)

*Primary Examiner* — Mark Kopec
(74) *Attorney, Agent, or Firm* — Ladas & Parry LLP

(57) ABSTRACT

Disclosed herein is a coating composition for prevention of substrate oxidation/corrosion comprising energy level modulated conjugated polymer in combination with hydrophobic, spherical molecule in a suitable ratio. Particularly the invention relates to coating composition for protecting metal and alloy comprising the derivatives of polythiophene and polyphenylene vinylene with lower energy level, wherein the pores on the polymeric film are filled/blocked with hydrophobic, spherical molecule to enhance the efficiency of polymer against the corrosion.

16 Claims, 6 Drawing Sheets

(51) Int. Cl.
  *H01B 1/12* (2006.01)
  *C08K 3/04* (2006.01)
  *C09D 165/00* (2006.01)
  *C09D 165/02* (2006.01)
  *C23F 13/02* (2006.01)

(52) U.S. Cl.
  CPC ............ *C08G 2261/3223* (2013.01); *C08G 2261/3422* (2013.01); *C08G 2261/58* (2013.01)

(56) References Cited

OTHER PUBLICATIONS

Mahale et al., "Band edge modulated conjugated polymers for oxidation prevention," Phys. Chem. Chem. Phys., 14, pp. 4577-4583 (2012).*

Vanlaeke, P. et al., "P3HT/PCBM bulk heterojunction solar cells: Relation between morphology and electro-optical characteristics," Solar Energy Materials and Solar Cells, 90, pp. 2150-2158 (2006).*

Zimmermann et al "Longterm stability of efficient inverted P3HT:PCBM solar cells", Solar Energy Materials & SOlar Cells 93 (2009) 491-496.*

International Search Report and Written Opinion of the International Searching Authority dated Jun. 12, 2013 for Application No. PCT/IB2013/050606.

Montanari, Ivan, et al., "Transient optical studies of charge recombination dynamics in a polymer/fullerene composite at room temperature" Applied Physics Letters, vol. 81, No. 16, Oct. 14, 2002, pp. 3001-3003.

Brabec, Christoph J., et al., "Polar Solar Cells", Advanced Functional Materials, vol. 11, No. 1, Feb. 1, 2001, pp. 15-26.

Vanlaeke, P., et al., "P3HT/PCBM bulk heterojunction solar cells: Relation between morphology and electro-optical characteristics", Solar Energy Materials & solar Cells, vol. 90, No. 14, pp. 2150-2158.

Yu, G., et al., "Polymer Photovoltaic Cells: Enhanced Efficiencies via a Network of Internal Donor-Acceptor Heterojunctions", Science, vol. 270, Dec. 15, 1995, pp. 1789-1791.

* cited by examiner

COATING COMPOSITION FOR PREVENTION OF SUBSTRATE OXIDATION

RELATED APPLICATION INFORMATION

This application is a 371 of International Application PCT/IB2013/050606 filed 24 Jan. 2013 entitled "Coating Composition For Prevention Of Substrate Oxidation", which was published in the English language oln 1 Aug. 2013, with International Publication Number WO 2013/111080 A2 and which claims priority from Indian Patent Application Number 215/DEL/2012 filed 25 Jan. 2012, the content of which is incorporated herein by reference.

The following specification particularly describes the nature of the inventions and manner in which it is to be performed.

FIELD OF THE INVENTION

The invention provides coating composition for prevention of substrate oxidation/corrosion comprising energy level modulated conjugated polymer in combination with hydrophobic spherical molecule in a suitable ratio.

Particularly the invention relates to coating composition for protecting metal and alloy comprising of ether derivatives of polythiophene and poly phenylene vinylene with lower energy level than oxygen energy level, wherein the pores on the polymeric film are filled/blocked with hydrophobic molecule to enhance the efficiency of polymer against the corrosion.

BACKGROUND AND PRIOR ART

Corrosion is the disintegration of an engineered material into its constituent atoms due to chemical reactions with its surroundings. In the most common use of the word, corrosion means electrochemical oxidation of metals in reaction with an oxidant such as oxygen. Such type of damage typically produces oxide(s) and/or salt(s) of the original metal.

Corrosion resistant coatings protect metal components against degradation due moisture, salt spray, oxidation or exposure to a variety of environmental or industrial chemicals. A wide variety of corrosion resistant coating types are available to match the performance requirements of a specific application. Several other techniques to control or prevent corrosion are known such as anodization, cathodic protection, biofilm coatings and controlled permeability formwork.

The anti-corrosion coating of conjugated polymers is reported in the literature, where G. Kousik, in Progress in Organic Coatings 43 (2001) 286-291 describes in situ electro polymerization of polythiophene coating for providing corrosion protection to mild steel surface.

Further the conjugated polymers based on amino derivatives of poly(phenylene vinylene)s as corrosion protective coatings in marine environments is highlighted by ZARRAS Peter in *PACE* 2004, pp. 175-181 [Note(s): [226 p.][Document: 7 p.] whereas improved synthesis and corrosion properties of Poly(bis-(dialkylamino)phenylene vinylene)s (BAMPPV) is reported in *Electroactive Polymers for Corrosion Control* Chapter 8, pp 140-155 by Nicole Anderson et al.

Additionally U.S. Pat. No. 6,762,238 (Sze Cheng Yang et al.) discloses anti-corrosive coating composition which contains a polymeric complex useful as a water-borne paint to be applied onto a metal substrate electrophoretically or non-electrophoretically also European Patent No. EP19962441 discloses corrosion resistant coatings comprising electrically conductive polymer for biodegradable metallic stents; wherein an implantable stent comprising a biodegradable magnesium or magnesium alloy metallic region and a biodegradable polymeric corrosion resistant coating over the biodegradable metallic region that slows the rate of corrosion of the biodegradable metallic region upon implantation into a subject, wherein said corrosion resistant coating comprises an electrically wherein an imaging contrast agent, is gold particles.

Conjugated polymers (CPs) represent a major class of active materials in electronic devices. They have also become the material of choice for antistatic coating, buffer layers and protective coatings. CPs based protective coatings are proposed to impede metal and alloy (MA) oxidation by either acting as barrier coating or inducing metal alloy oxidation that results in formation of an oxide barrier layer. MA are prone to atmospheric oxidation by virtue of their higher Fermi energy level compared to the oxygen energy level (−5.2 eV with respect to vacuum). Because of the commensurate energy levels, the electron transfer from the MA to oxygen is facile and results in the formation of oxides of MA. The oxides do not possess the desirable properties of the native state of MA, hence the oxide formation is a disadvantage.

The conducting polymers and their applications is disclosed in, *Current Physical Chemistry,* 2012, 2, 224-240 (Murat Ates et al.) wherein conducting polymers such as poly(thiophene), poly(para-phenylene vinylene), poly(carbazole), polyaniline, polypyrrole, are useful in supercapacitors, Light emitting diodes (LEDs), Solar cells, Field effect transistor (FET), and Biosensors.

It also discloses the combination of poly(3-hexylthiophene) (P3HT) and ([6,6]-phenyl-C61-butyric acid methyl ester) PCBM (C60 derivative), which shows good photovoltaic properties with efficiencies beyond 5%.

Youngkyoo Kim et al. in *Nature Materials* 5, 197-203 (2006) discloses strong regioregularity effect in self-organizing conjugated polymer films and high-efficiency polythiophene: fullerene solar cells" the influence of polymer regioregularity (RR) on the molecular nanostructure, material properties and device performance, wherein the highest efficiencies have been achieved using blends of poly(3-hexylthiophene) (P3HT) and a fullerene derivative also supported by O. Ourida et al. in *SATRESET*, Vol. 1, No. 3, pp. 90-92, 2011. However Vanlaeke, Peter et al. in Solar Energy Materials and Solar Cells, 90(14). p. 2150-2158, 2006 describes the performance of organic solar cells based on the blend of regioregular poly(3-hexylthiophene) (P3HT) and phenyl-C61-butyric acid methyl ester (PCBM).

Further Annick Anctil et al. in *MRS Proceedings*/Volume 1031/2007 reports composite blends of poly[2-methoxy-5-(2-ethylhexyloxy)-1,4-phenylene vinyl ene](MEH-PPV) and poly(3-hexylthiophene)—(P3HT with PCBM[60] and PCBM[70]. in the 1:4 MEH-PPV:PCBM ratio.

CPs that are used for MA oxidation prevention have a HOMO frontier orbital energy above the oxygen energy level, making the CPs susceptible for atmospheric oxidation (cf FIG. 1) upon oxidation, the holes generated on the polymer are filled by electrons transferred from the MA resulting in formation of an oxide layer. The electron transfer pathways of polymer coated MA have been shown in (FIG. 1).

Due to abundance of oxygen in the atmosphere, the spontaneous process of cascade electron transfer continues to oxidize the MA which leads to corrosion; also any cracks in the oxide layer would lead to delamination of the CPs and expose the substrate to an oxidation environment. Also the pores and the excitons on the polymer aggravate substrate oxidation, thus to increase the polymer's effectiveness in preventing metal oxidation, the pores in the polymer films must be blocked and the excitons must be quenched.

In view of above there is need to prevent the metal and alloy oxidation by employing the conjugated polymer having the electron energy (HOMO) level below oxygen energy level where the spaces of pinholes or pores of polymer surface is blocked by hydrophobic, spherical molecule to repel or preclude the oxidizing species from reaching the metal alloy.

OBJECTIVE OF INVENTION

The main objective of the present invention is to provide coating composition for prevention of substrate oxidation/corrosion comprising of band edge modulated conjugated polymers selected from the group consisting of ether derivatives of poly phenylene vinylene or polythiophene and hydrophobic spherical carbon molecules.

Another objective of the present invention is to provide industrially viable coating composition where conjugated polymer surface is totally filled with hydrophobic molecules to preclude oxidizing species from reaching the metal and alloys.

SUMMARY OF THE INVENTION

Accordingly, the present invention provides a coating composition for prevention of substrate oxidation/corrosion comprising of band edge modulated conjugated polymers selected from the group consisting of ether derivatives of poly phenylene vinylene or polythiophene and hydrophobic spherical carbon molecules in a specific ratio of 1:2 (% wt).

In one embodiment of the present invention ether derivatives of polythiophene and ether derivatives of poly phenylene vinylene are

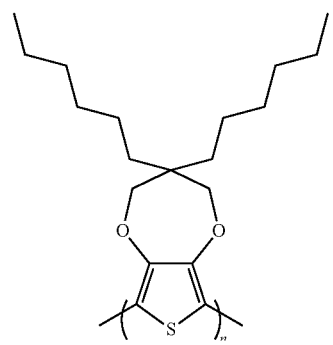

wherein n is an integer greater than 1,

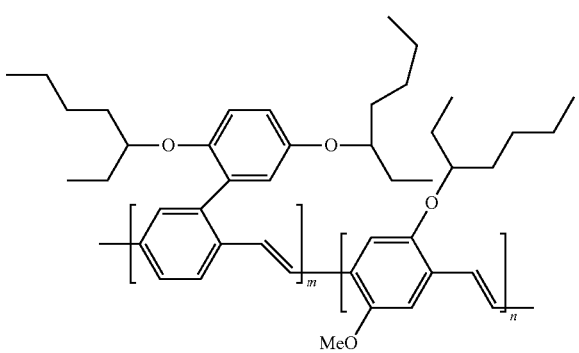

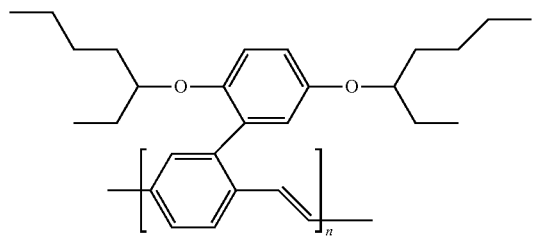

wherein n is an integer greater than 1, m is an integer greater than 1

In an embodiment of the present invention the band edge modulated conjugated polymer is optionally alkyl derivatives of polythiophene that is poly(3-hexylthiophene) having Formula P3.

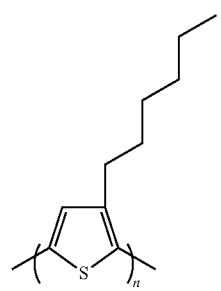

wherein n is an integer greater than 1,

In another embodiment of the present invention hydrophobic, spherical, carbon molecules is [6,6]-phenyl-C61-butyric acid methyl ester (PCBM).

In yet another embodiment of the present invention PCBM having van der Waals diameter in the range of 1.0 to 1.5 nm.

In yet another embodiment of the present invention the substrate is metal alloy selected from the group consisting of iron alloy, aluminum alloy, copper alloy, cobalt alloy, nickel alloy; wherein the iron alloy is steel.

In still another embodiment of the present invention the band gaps of lower energy absorption onset of conjugated polymer of formula P1, P2, P3 and P4 are 2.4, 2.7, 2.3 and 2.0 eV respectively.

In still another embodiment of the present invention the highest occupied molecular orbital energy level of conjugated polymers of formula P1, P2, P3 and P4 are −6.0, −5.8, −5.1 and −4.4 respectively.

In still another embodiment of the present invention the charge carrier mobility of conjugated polymers of formula P1, P2 and P3 are $1.7 \times 10^{-9}$; $8.0 \times 10^{-10}$ and $6.1 \times 10^{-5}$ cm$^2$V$^{-1}$s$^{-1}$ respectively.

In still another embodiment of the present invention the conjugated polymer-PCBM blend having higher water contact angle in the range of 90° to 110°.

ABBREVIATIONS

Figure 1:
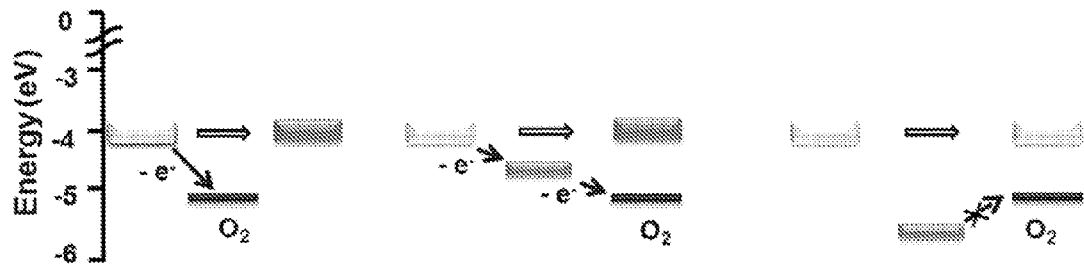
FIG. 1 depicts energy level and electron transfer pathways for substrate oxidation and prevention.

HOMO=Highest occupied molecular orbital
LUMO=Lowest unoccupied molecular orbital
CPs: Conjugated polymers
PCBM: [6,6]-phenyl-C61-butyric acid methyl ester
MA: Metal and alloy
ET: Electron transfer

DETAILED DESCRIPTION OF INVENTION

The invention will now be described in detail in connection with certain preferred and optional embodiments, so that various aspects thereof may be more fully understood and appreciated.

The present invention provides coating composition for resisting the oxidation or corrosion of metal substrate, comprising of conjugated polymers (CPs) having lower $E_{HOMO}$ level and pore fillers or exciton quencher in a specific ratio of 1:2 (% wt).

The invention provides coating composition comprising the combination of conjugated polymer having lower energy level selected from the group consisting of ether derivatives of polythiophene and poly phenylene vinylene and the spherical, hydrophobic, carbon molecules as a pore fillers.

The ether derivatives of polythiophene and poly phenylene vinylene is particularly selected from the group consisting of formula P1, P2 and P4, optionally the alkyl derivative of polythiophene of formula P3.

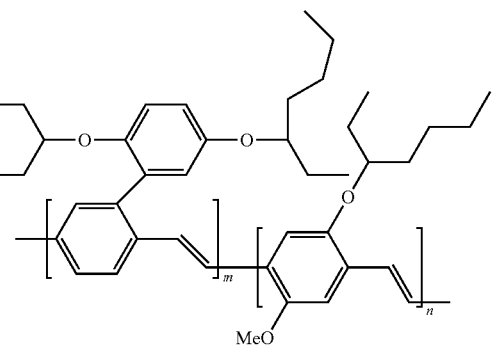

P1

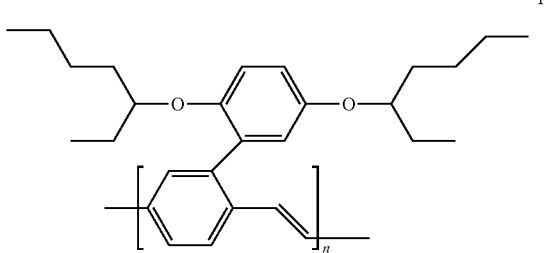

P2

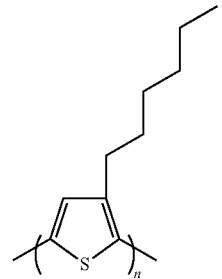

P3

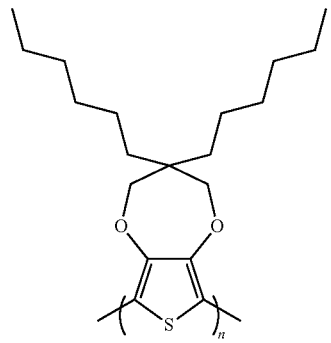

P4 wherein n is an integer greater than 1, m is an integer greater than 1

Further the spaces of the pin holes on the polymer (CPs) surface are filled by spherical, hydrophobic and ultra small molecule to repel the oxidizing species from reaching the MA surface, wherein the spherical molecule is carbon 60 derivatives or fullerene derivative, preferably [6,6]-phenyl-C61-butyric acid methyl ester (PCBM).

It is essential to note that the PCBM accepts electrons from the excitons that are generated upon illumination of the CPs. The electron transfer from the excitons to the PCBM occurs at the time scale of femto seconds (≈45 fs). The rapid electron transfer from the polymers to PCBM delays the electron transfer to oxygen and effectively prevents the substrate oxidation.

In the invention, the pinholes in the formulations of the conjugated polymers that resist oxidation are filled with a spherical carbon molecule in the size range of 1-5 nm, preferably [6,6]-phenyl-C61-butyric acid methyl ester (PCBM) with a van der Walls diameter of about 1.0 to 1.5 nm is used to fill the pinholes. Further the PCBM plays a dual role of pore filler and an exciton quencher.

Exciton is an electron-hole pair, wherein the hole resides on the HOMO and electron on the LUMO.

Also the conjugated polymers with energy levels lower than oxygen for oxidation resistance such polymers i.e. P1 P2 P3 and P4 are used for oxidation resistance in nano form.

In the invention, the coating composition of CPs is in the form of films, paints, laminates and like thereof. The protective coating comprising of said composition can be performed by the known technique not limited to electroplating, painting, conversion, sputtering, plating, thermal spraying, plasma spraying, anodizing, sol-gel, Optical coatings, polymer coatings, powder coating, spin coating, gap coating, varnish printing and like thereof.

According to the invention the substrate is metal and alloy, wherein metal is selected from a Al, Cu, Co, Ni, Fe, Cr, Ti, Zn, Mg, Sn, Na, Ag, Pt, K, In, Hg, Pb, Bi, either alone or mixtures thereof, whereas alloy is not limited to bronze, brass, Meteoric iron, Amalgams, Precious-metal alloys, Steel, pig iron or alloys of Al, alloys of Cu, alloys of Co, alloys of Ni, alloys of Fe, alloys of Cr, alloys of Ti, alloys of Zn, alloys of Mg, alloys of Sn, alloys of Na, alloys of Ag, alloys of Pt, alloys of K, alloys of Hg, alloys of Pb, alloys of Bi, alloys of In and like thereof; preferably steel is used as substrate because the oxidation is neither rapid nor sluggish, thus is easier to handle.

Further the oxidation resistance experiments were carried out by employing a polymer coated steel substrate as working electrode, calomel electrode as reference and large Pt foil as counter electrode in suitable concentration of NaCl solution and later with suitable concentration HCl. The polymer's effectiveness in preventing substrate oxidation is measured and reported as resistance ($\Omega/cm^2$) of the polymer film. The concentration of NaCl solution used in the process is in the range of 0.1 to 5 M, whereas for HCl the range is 0.05 to 0.2 M or 0.05 to 0.2 N.

Figure 9:
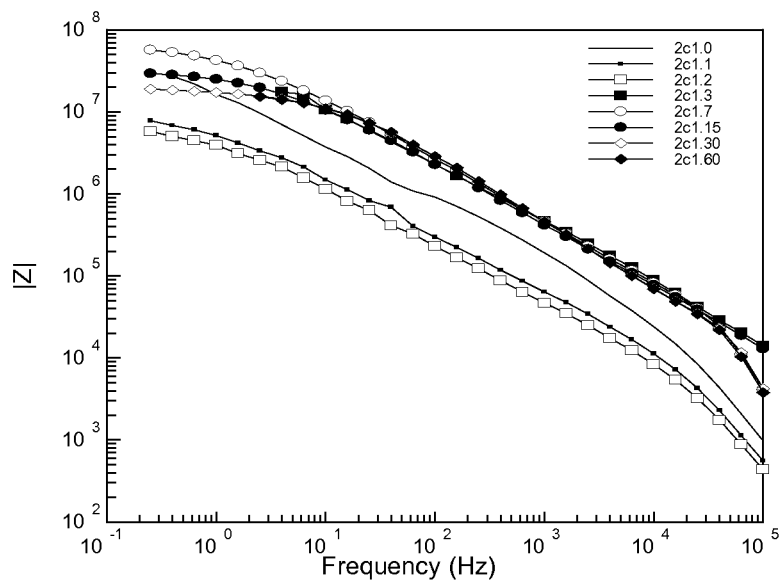
FIG. 9 depicts corrosion resistance (Z) test results for Polymer II in 3% NaCl corrosive solutions.
Figure 10:
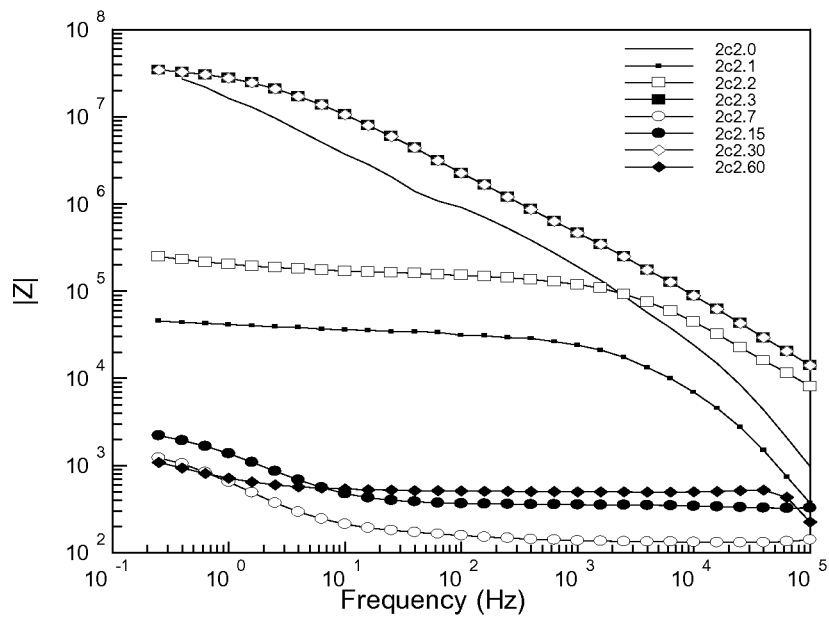
FIG. 10 depicts corrosion resistance test (Z) results for Polymer II in 1% HCl solution.

Prolonged exposure of the polymer coated substrate to oxidizing environment enhances the probability of oxidizing species reaching the steel substrate. The corrosion resistance in 3% NaCl and 0.1 N HCl is shown in FIG. 9 and FIG. 10, respectively.

The conjugated polymer surface blended with PCBM particularly P1-PCBM, P2-PCBM, P3-PCBM and P4-PCBM are evaluated for oxidation prevention under physical and chemical condition.

The physical condition not limited to solar radiation, fermi energy, band edge, photovoltage or gate voltage, surface hydrophobicity, whereas chemical condition comprises treatment with salt solution having concentration 0.1 to 1.5 M, preferably 0.2-0.8 M of NaCl, electrochemical coating with noble metals selected from the group consisting of ruthenium, rhodium, palladium, silver, osmium, iridium, platinum, and gold either alone or mixtures thereof.

Estimation of Band Edges and Fermi Energy Level

Figure 2:
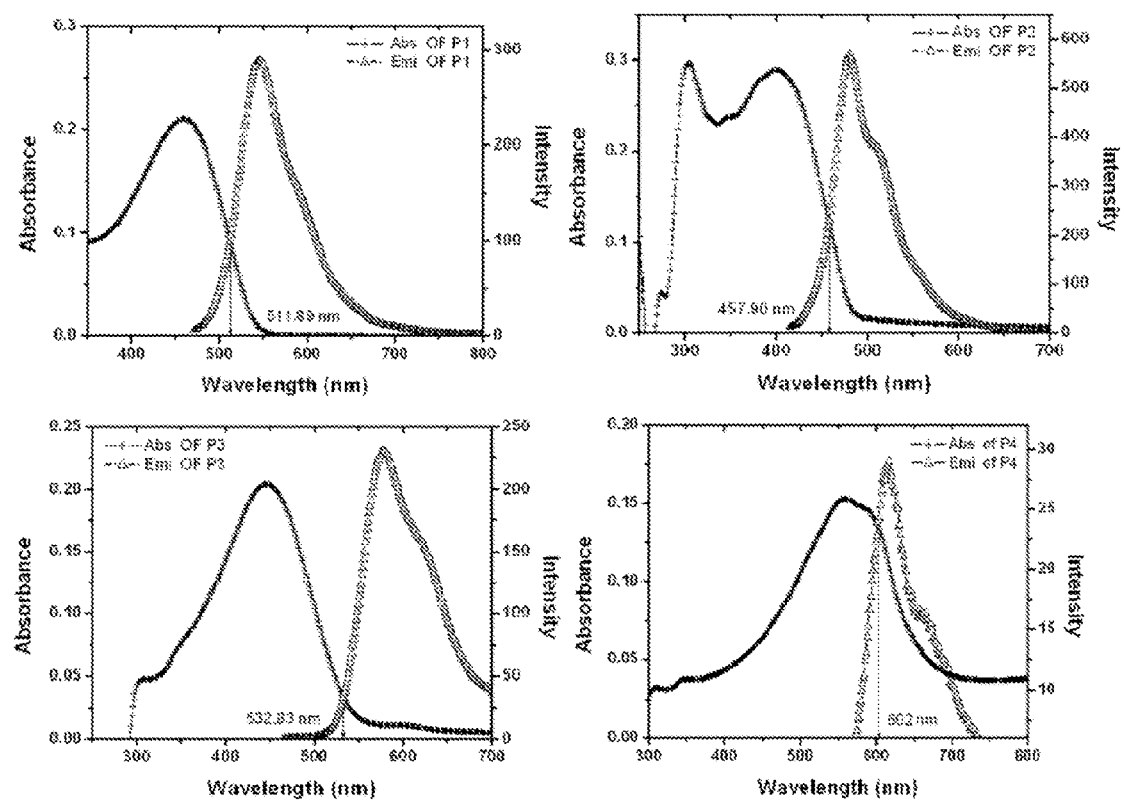
FIG. 2 depicts UV-vis absorption and emission spectra of P1-P4 recorded in chloroform solution.

The UV-vis absorption spectra were recorded using dilute solution of polymers in chloroform. The $\lambda$max of P1 and P3 were centered at 455 and 442 nm, respectively (cf FIG. 2). The inter band transition of P2 splits into two peaks at 304 and 400 nm. Similarly, P4 showed two absorption peaks at 548 and 581 nm (FIG. 2). The appearance of two distinct peaks in the cases of polymers P2 and P4 is due to vibronic coupling, which suggests high degree of regularity in the polymer backbone. UV-vis spectra of thin films of the polymer were recorded using polymer coated quartz slides as substrate. The $\lambda$max of P1, P2, P3, and P4 were red shifted by 6, 12, 113 and 10 nm, respectively. The shift in absorption global maximum is a result of planarization of polymer chains in thin films. The bandgaps estimated from the low energy absorption onset of P1, P2, P3 and P4 are 2.4, 2.7, 2.3 and 2.0 eV, respectively. The bandgaps can also be estimated from the wavelength at the intersection of absorption and emission spectra. The emission spectra were recorded using dilute solution of polymers and exciting at their corresponding $\lambda$max determined from their absorption spectra (FIG. 2).

TABLE 1

Summary of electronic and surface properties of polymers P1-P4

| | Band gap/ eV | $\lambda_{soln}$/ nm | $\lambda_{film}$/ nm | Hole mobility/ $cm^2 V^{-1} s^{-1}$ | Water CA/° | Resistance/ $\Omega\ cm^{-2}$ |
|---|---|---|---|---|---|---|
| P1 | 2.4 | 455 | 461 | $1.7 \times 10^{-9}$ | 78 | $1.9 \times 10^4$ |
| P2 | 2.7 | 304, 400 | 412 | $8.0 \times 10^{-10}$ | 87 | $1.4 \times 10^4$ |
| P3 | 2.3 | 442 | 555 | $6.1 \times 10^{-5}$ | 78 | $7.3 \times 10^3$ |
| P4 | 2.0 | 548, 581 | 591 | — | 71 | $4.9 \times 10^2$ |

Figure 3:
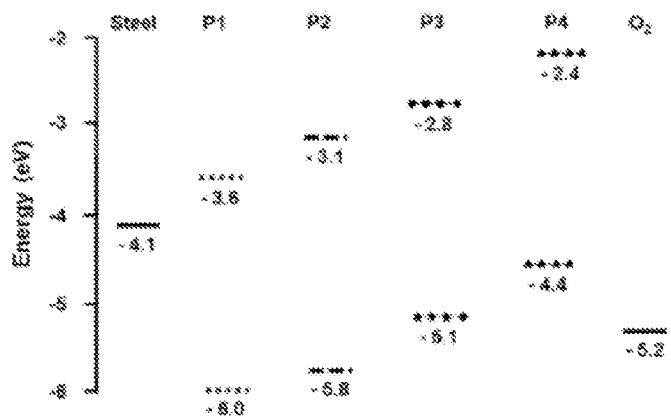
FIG. 3 depicts energy level diagram of steel, polymers P1-P4 and oxygen estimated with respect to the vacuum level.

The bandgap calculated using the wavelength at the intersection is listed in Table 1. The frontier orbital energy levels were estimated using cyclic voltammetry. A thin film of the polymers was coated on Pt wire by dipping the electrode in chloroform solution of the polymers and the cyclic voltammograms were recorded in 0.1 M tetrabutyl ammoniumperchlorate in acetonitrile using Ag/Ag+ as a reference electrode. The HOMO energy level of the polymers was calculated by normalizing the onset of oxidation peaks with respect to the potential of ferrocene/ferrocenium internal redox couple, whereas the LUMO energy levels were estimated by adding the optical bandgap to that of the HOMO energy levels estimated by cyclic voltammetry. The band edges thus calculated for the four polymers are schematically shown in FIG. 3. wherein the HOMO energy level of said conjugated polymers P1, P2, P3 and P4 were measured as −6.0, −5.8, −5.1 and −4.4 eV respectively as against the oxygen Fermi energy level of −5.2 eV.

Figure 11:
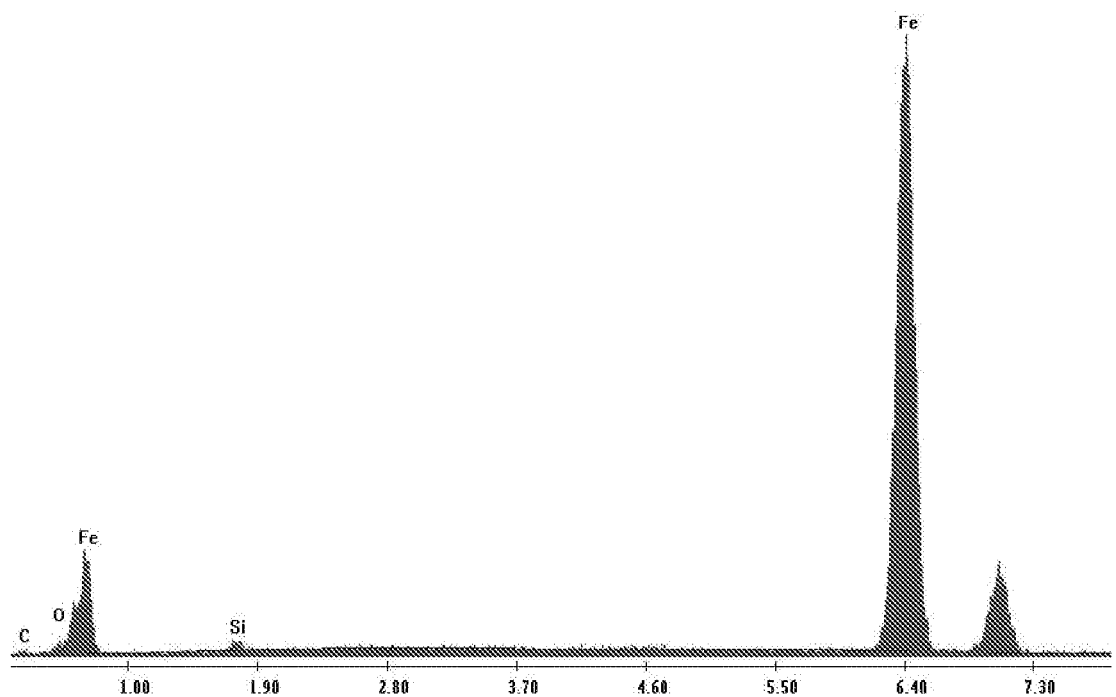
FIG. 11 Energy Dispersive X-ray spectroscopy (EDX)

Steel has been chosen as substrate, wherein the elemental composition of the steel substrate was determined using Energy Dispersive X-ray spectroscopy (EDX). The steel comprises predominantly iron (96%), carbon (3%) and small amount of other elements FIG. 11. The Fermi energy level of steel is likely to be close to iron, but accurate determination of the Fermi energy level is essential to understand the electron transfer process between the polymer and substrate. The Fermi level the electrochemical potential of the electrons in solid. Thus the open circuit potential can be related to the Fermi energy level by the following relationship EF=−4.7 eV −U(SCE), wherein U(SCE) is the open circuit potential with respect to the calomel reference electrode. The open circuit potential was determined to be −0.6 V with respect to the calomel electrode. Thus, the Fermi energy level was estimated to be −4.1 eV.

Electrochemical Impedance Spectroscopic Studies

Figure 4:
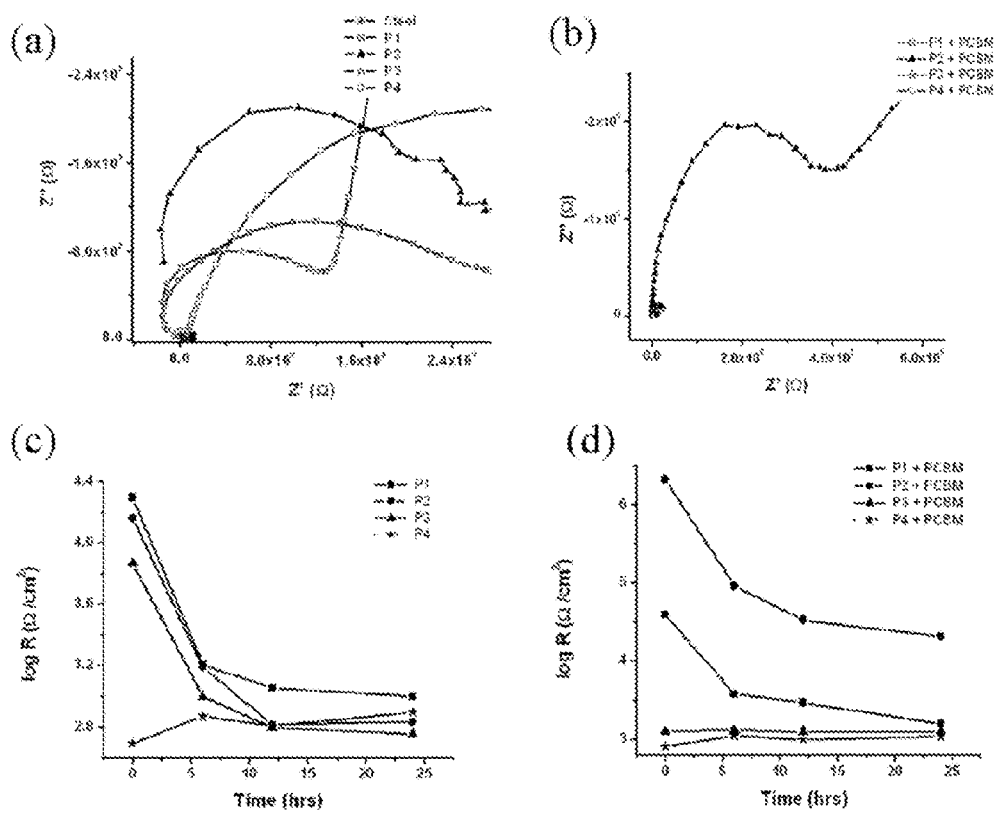
FIG. 4 depicts electrochemical impedance spectra of P1-P4 (a) and polymer-PCBM coated steel substrate (b) recorded in 0.5 M NaCl solution. Change in polymer (c) and polymer-PCBM (d) film resistance as a function of exposure to 0.5 M NaCl.

According to the invention the electrochemical impedance spectroscopy (EIS) provides an accelerated measure of a coating's effectiveness in preventing substrate oxidation. The experiments were carried out by employing a polymer coated steel substrate as the working electrode, the calomel electrode as reference and large Pt foil as a counter electrode in 0.5 M NaCl solution. The polymer's effectiveness in preventing substrate oxidation was measured and reported as resistance ($\Omega cm^{-2}$) of the polymer film. The effectiveness was calculated by fitting semicircle to the Nyquist plot obtained for all the polymers (FIG. 4). The resistance gradually decreases from P1 to P4, which was proportionate to the HOMO energy level of the polymers (FIG. 3). P1 and P2 showed resistance in the order of $10^4$ $\Omega cm^{-2}$ and the high resistance was due to their low lying HOMO energy level below oxygen. Therefore the electron transfer from polymer to oxygen is not feasible in P1 and P2 polymers. The resistance of P4 and bare steel substrate was very close indicating the ineffectiveness of the polymer to prevent steel oxidation, which was a consequence of the high lying HOMO energy level.

It is necessary to study the change in film resistance as a function of time of exposure to oxidizing environment. Because, prolonged exposure of the polymer coated substrate to an oxidizing environment enhances the probability of oxidizing species reaching the steel substrate.

Accordingly the probability of oxidizing species was tested by exposing the polymer film coated substrates to 0.5 M NaCl for 6, 12 and 24 h. The film resistance decreased by about 90% for P1, P2 and P3, after six hours of exposure (FIG. 4). It was confirmed that porous film enough for ions to reach the steel substrate and induce substrate oxidation. The resistance of P4 did not vary significantly, but the resistance was always close to the bare steel substrate.

Further the effect of solar light illumination was also studied because visible light absorption is an innate property of conjugated polymers, upon solar light illumination excitons were generated on the polymer. The LUMO energy levels of all four polymers (P1, P2, P3 and P4) are well above the oxygen energy level, hence the illuminated polymers are highly susceptible to oxidation. The resistance of all the four polymers after solar light illumination was close to the resistance of the bare steel, which confirmed that the exciton formation makes the polymer vulnerable for atmospheric oxidation.

It is evident from the experiments that the pores and the excitons on the polymer aggravate substrate oxidation, thus to increase the polymer's effectiveness in preventing steel oxidation, the pores in the polymer films must be blocked and the excitons must be quenched. Particularly the pore filler/blocker or exciton quencher is selected from C60 derivatives; preferably, PCBM, which is anticipated to fill the pores in the polymer and repel the oxidizing species from accessing the substrate. PCBM was blended with the conjugated polymers wherein the ratio of polymer to PCBM was maintained specific at 1:2 (weight percent). The films prepared using the polymer-PCBM blend showed better resistance compared to the film prepared by polymer itself (FIG. 4). Further increase in resistance was observed in the case of P2-PCBM film, which can be attributed to PCBM filling the pores on the polymer film and the low lying HOMO energy level. It is necessary to note that the resistance of P3 and P4 did not increase despite the presence of PCBM because of their high lying HOMO energy level.

The resistance of P2-PCBM blend was detected to be $2\times10^4$ $\Omega cm^{-2}$ after 24 hours of exposure to 0.5 M NaCl, which is an order of magnitude better than the resistance measured for P2 by itself (FIG. 4). The PCBM effectively fills the pore and repels the hydrophilic oxidizing species from reaching the substrate. PCBM is also an acceptor to all the polymers used in this study by virtue of having lower LUMO energy level compared to the LUMO of all the polymers. The Stern-Volmer quenching constants calculated using the polymers and PCBM are provided in ESI. The electron transfer to PCBM from a conjugated polymer occurs at the femto second time scale. Therefore, the electron transfer to oxygen from the polymer may be delayed in the presence of PCBM. This was tested by exposing the polymer-PCBM blend to solar radiation. The P2-PCBM blend showed two orders of magnitude higher resistance than the resistance showed by P2 itself. P1, P3 and P4 showed low resistance despite the presence of PCBM. The poor resistance exhibited by P3 and P4 was attributed to their HOMO energy level i.e. above the oxygen energy level. The inefficient electron transfer from the LUMO of P1 to PCBM leads to poor resistance. For efficient electron transfer from the LUMO of the donor to the LUMO of the acceptor, the band offset should be 0.3-0.4 eV. In the case of P1-PCBM the difference in LUMO energy is only 0.1 eV, hence the excitons generated in P1 are not efficiently quenched by PCBM.

Therefore the presence of molecules that accept electrons from the polymer would delay the substrate oxidation, whereas molecules that are inefficient electron transfer quenchers have infinitesimal impact on polymer's oxidation prevention.

Alternatively, a polymer film was coated on the steel substrate then the same polymer was added on top of the existing film (FIG. S10, ESI) wherein the first film was dissolved and a new film reformed upon solvent evaporation.

In the invention the films effectiveness in preventing substrate oxidation was studied using electrochemical impedance spectroscopy. The resistances were measured from the Nyquist plots $1\times10^4$ (P1), $4\times10^4$ (P2), $2\times10^4$ (P3) and $1\times10^4$ (P4). The resistance did not vary significantly in the cases of P1 and P2, but it has decreased in the cases of P3 and P4 compared to single layer coated substrates due to the dissolution of the film upon addition of the second layer. Therefore, filling the pores with nanoparticles such as PCBM is better and effective.

Charge Carrier Mobility Measurements

Figure 5:
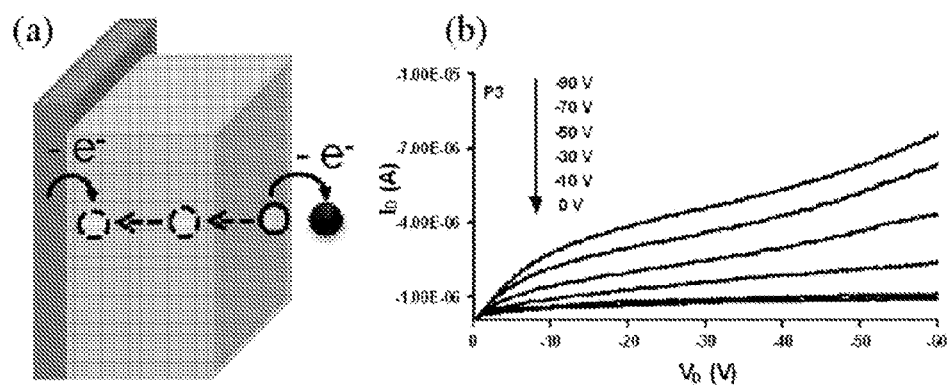
FIG. 5 depicts (a) the migration of holes generated by atmospheric oxygen to the base of the substrate, (b) output characteristics I-V curve of P3 measured using bottom gate field effect transistors.

The polymer upon oxidation loses electrons to oxygen creating holes on the surface. These holes migrate in the polymer film towards the substrate, wherein electrons are transferred to fill the holes (FIG. 5). Thus, hole carrier mobility plays an important role in oxidation prevention by polymers.

In the instant study the charge carrier mobility of the polymers was evaluated using bottom gate, bottom contact field effect transistors. The polymers were spun on the pre-fabricated transistor substrates at a spinning speed of 2000-3000 rpm. Then as a function of constant applied gate voltage, the drain current was swept in the negative potential region to measure the hole carrier mobility. P1, P2 and P3 demonstrated a linear regime but only P3 showed a saturation regime in addition to a linear regime. P4 did not form a uniform film on top of the FET substrates; hence reliable output characteristics could not be measured. In the case of P1, the drain current ($I_D$) increase was measured at an applied gate voltage ($V_G$) of −10 V, which further increased upon increase in gate voltage. However, in the case of P2, the $I_D$ increase was measured at a $V_G$ of −70 V. The high $V_G$ required for a measurable increase in $I_D$ is an indication of poor charge carrier mobility. On contrary, a gradual increase of $I_D$ as a function of $V_G$ was observed in the case of P3 (FIG. 5). Particularly the measurements were carried out under atmospheric conditions to simulate the conditions under which the polymer was studied for oxidation prevention. Thus the charge carrier mobility may not be comparable to the measurements done at an inert and dry atmosphere. The charge carrier mobility calculated from the linear regime is summarized in Table 1. The lowest hole mobility of $8\times10^{-10}$ cm$^2$V$_{-1}$ s$^{-1}$ was evaluated for P2. Thus among the four polymers P2 polymer exhibits better oxidation prevention due to its lower hole mobility and it has HOMO below the oxygen energy level.

Determination of Surface Hydrophobicity

The instant polymers comprise linear and branched alkyl chains, which impart hydrophobicity to the surface upon film formation. The oxidation prevention studies have been carried out in a solution prepared using water. Thus the overall process involves interaction between the hydrophobic surface and the hydrophilic solvent.

In the instant study the effect surface hydrophobicity in oxidation prevention is described, where the contact angle of water droplet on top of the polymer film was measured, the water contact angle varies as a function of surface roughness. To annul the effect of surface roughness on hydrophobicity, smooth polymer film surfaces were prepared by spin coating chloroform solutions of the polymer. The water contact angle for P1, P2, P3 and P4 are 78°, 87°, 78° and 71°, respectively (Table 1). P2 showed slightly higher water drop contact angle than the other polymers. The P2 showed better oxidation prevention efficiency over other polymers. P1 showed two fold better oxidation prevention compared to P3, despite its same water drop contact angle and surface hydrophobicity.

Figure 6:
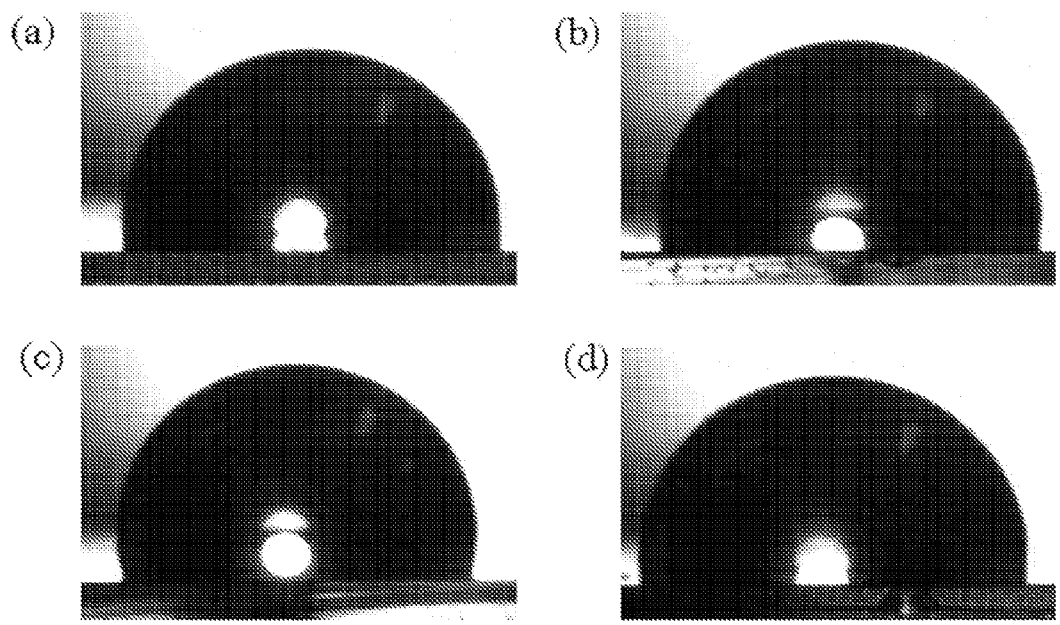
FIG. 6 depicts images of water droplet obtained upon contact with P1-P4 with PCBM (a to d).

It was evaluated that the surface hydrophobicity has trivial or no impact on polymer's effectiveness in oxidation prevention wherein the polymer's resistance increased several orders upon blending with PCBM. Particularly the conjugated polymer-PCBM blend having higher water contact angle in the range of 90° to 110° such as for P1, P2, P3 and P4, the water drop contact angle was found to be 93°, 93°, 102° and 94°, respectively (FIG. 6). Compared to polymer by itself, the polymer-PCBM blend showed a higher water contact angle suggesting the increase in surface hydrophobicity. Therefore, the PCBM enhanced the surface hydrophobicity by filling the pores. P2-PCBM showed highly enhanced resistance over the other three polymer-PCBM blends, despite having the lowest water drop contact angle and surface hydrophobicity.

SEM Studies for Analysis of Surface Morphology

Figure 7:
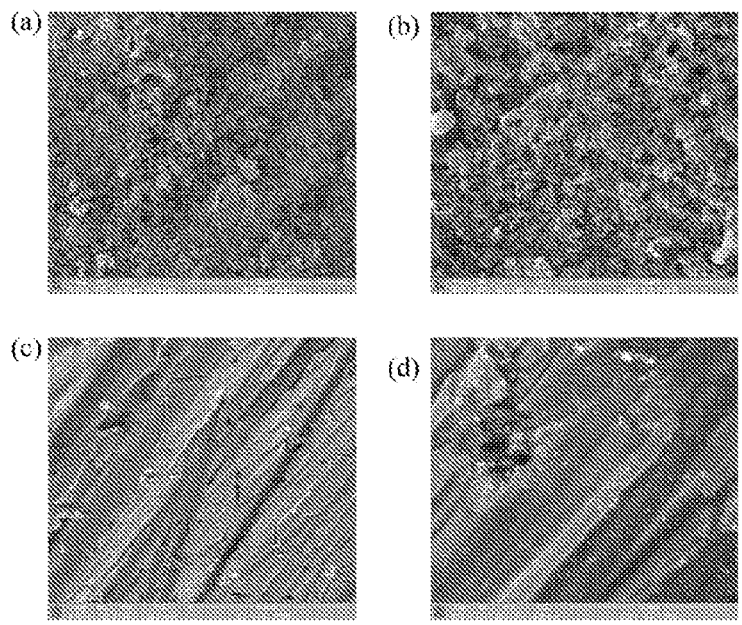
FIG. 7 depicts scanning electron microscopy images showing the morphology of (a) P3, (b) P4, (c) P2-PCBM and (d). P4-PCBM.
Figure 8:
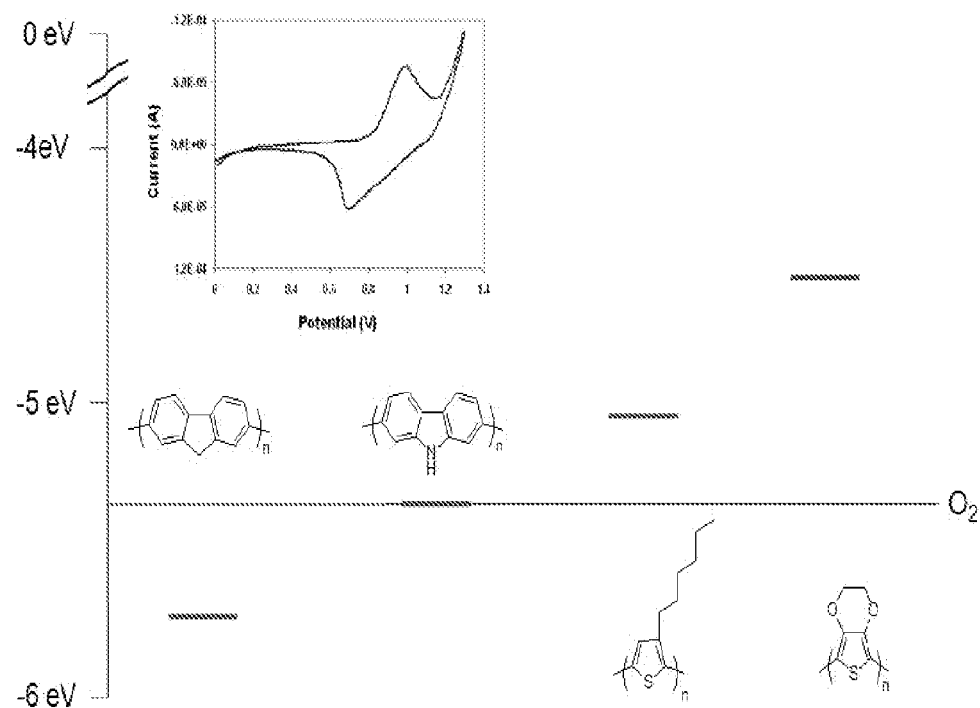
FIG. 8 depicts energy level diagram of steel, polymers I-IV and oxygen estimated with respect to vacuum level.

SEM imaging was carried out after exposing the polymer coated substrate to 0.5 M NaCl. The polymer film preparation procedure was similar to the ones used for EIS studies. The polymer films were exposed to 0.5 M NaCl for three hours and then the films were washed with water to remove adsorbed NaCl from the surface. The films were dried and coated with gold before electron microscope imaging. P3 and P4 showed formation of iron oxide that protruded through the film from the base substrate (FIG. 7). In the case of P4, the red iron oxide formation was visible to the naked eye after an hour of exposure to 0.5 M NaCl. On the other hand no discernible change in surface morphology was observed in the cases of P1 and P2. However, prolonged exposure did lead to formation of iron oxide on top of P1 and P2, indicating the adverse effect of pores on the polymer film.

The oxidation process is accelerated if the polymer films are exposed to 0.5 M NaCl and irradiated with solar light. The surface morphology of polymer-PCBM blend was investigated after six hours of exposure to 0.5 M NaCl. The surface of P2-PCBM film was unaffected, but the films prepared from P1, P3 and P4 in the presence of PCBM indicated the presence of iron oxide on top of the polymer film (FIG. 7). Therefore the polymer films devoid of pores with the HOMO energy level below oxygen contributes to resist the corrosion.

Consequently the instant invention provides band edge modulated polymers for substrate oxidation prevention wherein (i) conjugated polymers with the HOMO energy level below the oxygen energy level (P1, P2 and P4) are better candidates for oxidation prevention. (ii) The pores on the polymer films permit oxidizing species to reach the substrate and oxidize them, which was avoided by filling the pores with hydrophobic spherical molecules (PCBM). (iii) The pore fillers (PCBM) also act as exciton quenchers and thus delay the electron transfer from the polymer to atmospheric oxygen. (iv) Polymers with lower hole mobility are better candidates for oxidation prevention compared to their counterparts with higher hole mobility. (v) The surface hydrophobicity of the polymers has negligible or no influence on oxidation prevention such composition materials are useful for protecting metals and alloys used in a variety of applications from the oxidation.

The invention can be better understood by the following non-limiting examples.

The examples given are mere an illustration of the instant invention and should not be construed as limiting the scope of the present invention in any manner.

EXPERIMENTAL

Materials and Method

PCBM was purchased from American dye source and used without further purification. HPLC grade chloroform was purchased from Aldrich and distilled and stored over CaH$_2$. Pt wire (99.9%) was purchased from Arora Matthey and sealed in glass to be used as a working electrode. Steel substrates were purchased from local vendors.

The Pt wires were cleaned in piranha solution (Mixture of 18 M H$_2$SO$_4$ and H$_2$O$_2$) and then washed with copious amount of water. Further the electrodes were cleaned electrochemically by applying a constant current density of 30 mA cm$^{-2}$. The electrode's cleanliness was tested by recording cyclic voltammetry of a Pt electrode in 0.5 M H$_2$SO$_4$, which was used to coat the polymers and used as the working electrode for estimating the HOMO energy level. The cyclic voltammogram of 1 mM ferrocene in the presence of 0.1 M tetrabutyl ammoniumperchlorate was recorded and utilized to normalize the oxidation potential of the polymers. Electrochemical Impedance Spectra (EIS) of the polymer coated steel were recorded in 0.5 M NaCl in the frequency range of 10-106 Hz and the amplitude of 10 mV with respect to open circuit potential by a Solartron Electrochemical Interface SI 1287 coupled with a Frequency response analyzer 1255B. The steel substrates were successively polished using 400, 800 and 1200 grid sand paper to obtain a smooth surface. The substrates were then cleaned with solvents such as acetone and isopropanol. The active area of the electrode was kept constant using an insulating mask. A hole with a diameter of 5 mm was punched on an insulating tape and stuck on the steel substrate; such insulating mask also rendered the possibility of maintaining the polymer thickness constant.

The Field effect transistors (FET) were fabricated by spin coating the polymer on pre-fabricated substrates. The FET comprises heavily n-doped silicon as gate and 210 nm thick $SiO_2$ as gate oxide. The capacitance of the gate oxide is 14 $nF\ cm^{-2}$. The source and drain electrodes are made up of 30 nm thick gold, which was evaporated on top of a 10 nm thick ITO adhesion layer. The width and length of the channel are 10 mm and 2.5 mm, respectively. The linear regime field effect mobility was calculated using the reported procedure. A semiprobe probe station LA-150 with tungsten micro needles and micromanipulators was used to make contact with source, drain and gate electrodes. An Agilent 4156 C semiconductor probe analyzer was used to measure the I-V characteristics of the transistor. The water contact angle was measured using Milli-Q water in a Digidrop Contact Angle Meter. The samples for scanning electron microscopy imaging were prepared by coating a thin layer of gold on top of the samples to avoid charging upon exposure to electron beam.

Preparation of Polymer-PCBM Composition and Method of Coating

Polymer films are usually prepared by coating the substrate from chloroform solution. The Polymer-PCBM composition is prepared by mixing a polymer with PCBM in chloroform and then coating a film on the substrate. The ratio of polymer to PCBM was 1:2 (Weight %) in 0.5 ml chloroform (HPLC grade)

Advantages of Invention

The invention discloses an approach to identify suitable polymer for oxidation prevention from the band edges of the polymer. Furthermore, it also uses an organic nanoparticle to plug the pores in the polymer, which usually allows the corrosion promoting ions. The method of coating is similar to painting a substrate. No special precaution is required.

The invention claimed is:

1. An article comprising a substrate and a coating on the substrate to provide the substrate with protection against oxidation and/or corrosion, wherein the coating is disposed with respect to the substrate such that a bottom surface of the coating is in direct contact with a top surface of the substrate over an entirety of the top surface of the substrate and, with the article in an oxidizing environment, a top surface of the coating is exposed to the oxidizing environment over an entirety of the top surface of the coating, the coating comprising band edge modulated conjugated polymers selected from the group consisting of derivatives of poly phenylene vinylene or polythiophene and [6,6]-phenyl-C61-butyric acid methyl ester (PCBM) in a specific ratio of 1:2 (% wt), wherein the derivatives of polythiophene and derivatives of poly phenylene vinylene are

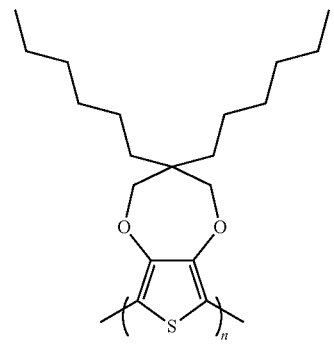

wherein n is an integer greater than 1,

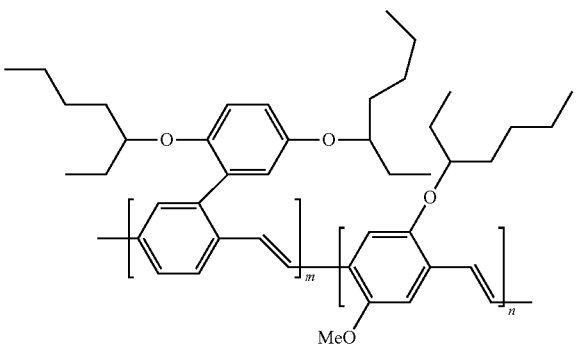

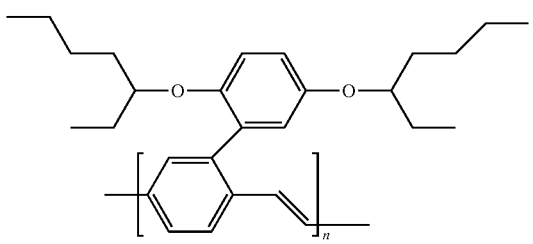

wherein n is an integer greater than 1, m is an integer greater than 1; and wherein the substrate comprises a metal or a metal alloy.

2. The article according to claim 1, wherein PCBM having van der Waals diameter in the range of 1.0 to 1.5 nm.

3. The composition according to claim 1, wherein the substrate is a metal alloy selected from the group consisting of iron alloy, aluminum alloy, copper alloy, cobalt alloy, nickel alloy; wherein the iron alloy is steel.

4. The article according to claim 1, wherein the band gaps of lower energy absorption onset of conjugated polymer of formula P1, P2, and P4 are 2.4, 2.7 and 2.0 eV respectively.

5. The article according to claim 1, wherein the highest occupied molecular orbital energy level of conjugated polymers of formula P1, P2, and P4 are −6.0, −5.8, and −4.4 respectively.

6. The article according to claim 1, wherein the charge carrier mobility of conjugated polymers of formula P1, and P2 are $1.7 \times 10^{-9}$; and $8.0 \times 10^{-10}$ $cm^2 V^{-1} s^{-1}$ respectively.

7. The article according to claim 1, wherein the conjugated polymer-PCBM blend has a water contact angle in the range of 90° to 110°.

8. A method for protecting an oxidizable or corrodible substrate against corrosion or oxidation which comprises applying thereto a coating composition to produce the article as claimed in claim 1.

9. An article comprising a substrate and a coating on the substrate to provide the substrate with protection against oxidation and/or corrosion in an oxidizing environment, wherein the coating is disposed with respect to the substrate such that a bottom surface of the coating is in direct contact with a top surface of the substrate over an entirety of the top surface of the substrate and, with the article in the oxidizing environment, a top surface of the coating is exposed to the oxidizing environment over an entirety of the top surface of the coating, the coating comprising band edge modulated conjugated polymer and [6,6]-phenyl-C61-butyric acid methyl ester (PCBM) wherein the band edge modulated conjugated polymer is an alkyl derivative of polythiophene that is poly (3-hexylthiophene) having Formula P3

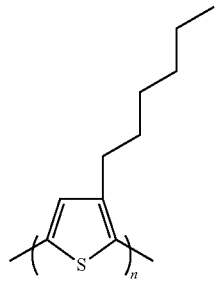

P3 wherein n is an integer greater than 1; and wherein the substrate comprises a metal or a metal alloy.

10. The article according to claim 9, wherein PCBM having van der Waals diameter in the range of 1.0 to 1.5 nm.

11. The article according to claim 9, wherein the substrate is a metal alloy selected from the group consisting of iron alloy, aluminum alloy, copper alloy, cobalt alloy, nickel alloy; wherein the iron alloy is steel.

12. The article according to claim 9, wherein the band gaps of lower energy absorption onset of conjugated polymer of formula P3 is 2.3 eV.

13. The article according to claim 9, wherein the highest occupied molecular orbital energy level of conjugated polymers of formula P3 is −5.1 eV.

14. The article according to claim 9, wherein the charge carrier mobility of conjugated polymers of formula P3 is $6.1 \times 10^{-5}$ $cm^2V^{-1}s^{-1}$.

15. The article according to claim 9, wherein the conjugated polymer-PCBM blend has a water contact angle in the range of 90° to 110°.

16. A method for protecting an oxidizable or corrodible substrate against corrosion or oxidation which comprises applying thereto a coating composition to produce the article as claimed in claim 9.

* * * * *